UNITED STATES PATENT OFFICE.

GEORG MERLING, OF ELBERFELD, AND HUGO KÖHLER, OF LEVERKUSEN, NEAR COLOGNE, GERMANY, ASSIGNORS TO FARBENFABRIKEN VORM. FRIEDR. BAYER & CO., OF ELBERFELD, GERMANY, A CORPORATION OF GERMANY.

BETA-ACETYLTRIMETHYLENETETRAMETHYLDIAMIN.

1,071,007. Specification of Letters Patent. Patented Aug. 19, 1913.

No Drawing. Original application filed October 8, 1912, Serial No. 724,635. Divided and this application filed November 7, 1912. Serial No. 730,017.

*To all whom it may concern:*

Be it known that we, GEORG MERLING and HUGO KÖHLER, doctors of philosophy, chemists, citizens of the German Empire, residing, respectively, at Elberfeld and Leverkusen, near Cologne, Germany, have invented new and useful Improvements in Beta-Acetyltrimethylenetetramethyldiamin, of which the following is a specification.

The present invention concerns the production of the hitherto unknown ketodiamin of the formula:

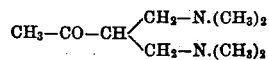

which is obtained by the two-fold introduction of the residue $-CH_2-N.(CH_3)_2$ into acetone.

In order to illustrate the new process more fully the following example is given, the parts being by weight:—765 parts of an aqueous dimethylamin solution (58.77 per cent.) are gradually dropped into 750 parts of aqueous formaldehyde (40 per cent.) which has to be well stirred and cooled and the solution of dimethylaminooxymethane thus obtained is mixed with 2000 parts of acetone, 500 parts of soda lye (0.3 per cent.). The temperature of the mixture gradually rises on standing from 10° to 30° C. After 3 to 4 days' standing at ordinary temperature the reaction is complete. The free alkali is removed from the brown solution by saturation with carbonic acid or by addition of bicarbonate and the oil is separated from the aqueous solution by potash and dried over potash. The excess of acetone is removed by distillation. The residue, a brown oil, is distilled *in vacuo* and the fraction from 45°–94° C. (19–20 mm.) a colorless oil (800 parts) is collected. The mixture thus obtained consists of about 33 per cent. of beta-acetylethyldimethylamin and 67 per cent. of beta-acetyltrimethylenetetramethyldiamin.

The beta-acetyltrimethylenetetramethyldiamin is a thick colorless almost odorless oil boiling at 96°–98° C. (16 mm.). It is soluble in water and is split up by heating it with dilute sulfuric acid into dimethylamin and beta-acetyl-allyl-dimethylamin.

In our application Serial No. 724,635 is described and claimed a process of producing keto compounds including the novel keto compound of the present application.

We claim:—

As a new article the beta-acetyltrimethylenetetramethyldiamin which is a thick colorless, almost odorless oil boiling at 96°–98° C. (16 mm.); being soluble in water; and being split up by heating it with dilute sulturic acid into dimethylamin and beta-acetyl-allyl-dimethylamin, substantially as described.

In testimony whereof we have hereunto set our hands in the presence of two subscribing witnesses.

GEORG MERLING. [L. S.]
HUGO KÖHLER. [L. S.]

Witnesses:
HELEN NUFER,
ALBERT NUFER.